US006954979B2

(12) United States Patent
Logan

(10) Patent No.: US 6,954,979 B2
(45) Date of Patent: Oct. 18, 2005

(54) FRAME JOINER PRESS SYSTEM

(76) Inventor: Curt Logan, 1100 Brown St., Wauconda, IL (US) 60084

(*) Notice: Subject to any disclaimer, the term of this patent is extended or adjusted under 35 U.S.C. 154(b) by 73 days.

(21) Appl. No.: 10/620,058

(22) Filed: Jul. 14, 2003

(65) Prior Publication Data

US 2005/0015971 A1 Jan. 27, 2005

(51) Int. Cl.[7] .......... B23P 19/00

(52) U.S. Cl. .......... 29/700; 29/281.1; 29/281.5; 29/432; 29/466; 29/468; 269/41; 269/42; 227/110; 227/152; 227/154

(58) Field of Search .......... 29/281.1, 281.3, 29/281.4, 281.5, 700, 432, 466, 467, 468, 29/469; 269/37, 41, 42; 403/401; 227/110, 227/152, 154; 411/461

(56) References Cited

U.S. PATENT DOCUMENTS

| | | | | | |
|---|---|---|---|---|---|
| 199,579 | A | | 1/1878 | Rose | |
| 949,096 | A | | 2/1910 | Stetson | |
| 2,903,699 | A | | 9/1959 | Mazzola | 1/149 |
| 3,590,458 | A | * | 7/1971 | Day | 29/281.4 |
| 4,061,321 | A | * | 12/1977 | Farr | 269/41 |
| 4,126,259 | A | | 11/1978 | Galer et al. | 227/30 |
| 4,236,702 | A | * | 12/1980 | Keddie | 269/41 |
| 4,258,873 | A | * | 3/1981 | Vela | 227/4 |
| 4,436,234 | A | | 3/1984 | Kennedy | 227/4 |
| 4,572,420 | A | | 2/1986 | Pistorius | 227/110 |
| 4,574,452 | A | | 3/1986 | Kennedy et al. | 29/432 |
| 5,390,842 | A | * | 2/1995 | Joyce | 227/110 |
| 5,605,270 | A | * | 2/1997 | Dunn | 227/140 |
| 5,791,639 | A | * | 8/1998 | Johnston et al. | 269/41 |
| 5,816,467 | A | * | 10/1998 | Dunn | 227/3 |
| 5,884,905 | A | * | 3/1999 | Keindl | 269/41 |
| 6,039,313 | A | | 3/2000 | Baculy | 269/168 |
| 6,089,434 | A | * | 7/2000 | Gleason | 227/3 |
| 6,338,478 | B2 | | 1/2002 | Baculy | 269/166 |
| 6,391,144 | B1 | * | 5/2002 | Gilbert, Jr. | 156/304.1 |
| 6,402,131 | B1 | | 6/2002 | Baculy | 269/168 |
| 6,519,825 | B1 | * | 2/2003 | Lambert et al. | 29/281.1 |
| 6,871,769 | B2 | * | 3/2005 | Roy | 227/152 |
| 2004/0194279 | A1 | * | 10/2004 | Roy | 29/464 |

FOREIGN PATENT DOCUMENTS

WO WO82/00323 2/1982

OTHER PUBLICATIONS

PushMaster, May 3, 2003, FrameCo Joining Tools for Picture Frames, pg. 1-4, Website.

Veezy Nailer, May 3, 2002, Veezy Nailer and Framing Tools, pg. 1 and 2, website.

BenchMaster, Frame Co BenchMaster Picture Frame Joiner & Fitting Tool, pg. 1 and 2.

* cited by examiner

*Primary Examiner*—Essama Omgba

(57) ABSTRACT

A frame joiner press system for efficiently driving a V-nail into two adjacent members of a picture frame. The frame joiner press system includes a base, a plurality of support shafts extending upwardly from the base, a support platform slidably positioned upon the support shafts, a plurality of retaining pins movably positioned within a support housing attached to the base, and a leverage structure for applying a downward force upon a pair of frame members. The retaining pins receive one or more V-nails and are springably positioned within the support housing. When the frame members are pressed upon the V-nails, the retaining pins are depressed into the support housing.

16 Claims, 9 Drawing Sheets

FRAME JOINER PRESS SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to V-nail joiners and more specifically it relates to a frame joiner press system for efficiently driving a V-nail into two adjacent members of a picture frame.

2. Description of the Related Art

V-nail joiners for creating picture frames have been in use for years. There are two main types of V-nail joiners: hand-tools and manual presses. Hand-tool joiners are basically comprised of a punch-like structure that receives a single V-nail to be inserted into the two frame members at the joint. The head of the hand-tool typically has a magnet for magnetically retaining the V-nail within the head prior to insertion of the V-nail into the wood frame. The user must either manually press the V-nail into the wood or use a hammer device to engage the hand-tool thereby driving the V-nail into the wood frame. The user must repeat the process to insert additional V-nails into the wood frame joint.

The manual presses for inserting a V-nail simply utilize the hand-tool version of the V-nail joiner in a press structure. The user still inserts a single V-nail into the hand-tool and then positions the hand-tool into the manual press for inserting the V-nail into the two adjacent wood members. The user must repeat the process to insert additional V-nails into the wood frame joint.

The main problem with conventional V-nail joiners is that they are difficult to operate and time consuming. A further problem with conventional V-nail joiners is that they can only insert a single V-nail into a frame joint. Another problem with conventional V-nail joiners is that sometimes they do not accurately position the V-nails within the frame joint.

Examples of patented devices which may be related to the present invention include U.S. Pat. No. 4,126,259 to Galer et al.; U.S. Pat. No. 4,572,420 to Pistorius; U.S. Pat. No. 199,579 to Rose; U.S. Pat. No. 4,574,452 to Kennedy et al.; U.S. Pat. No. 4,436,234 to Kennedy; U.S. Pat. No. 2,903,699 to Mazzola; U.S. Pat. No. 949,096 to Stetson; Patent WO82/00323 to Kennedy & Maher; U.S. Pat. No. 6,039,313 to Baculy; U.S. Pat. No. 6,338,478 to Baculy; and U.S. Pat. No. 6,402,131 to Baculy.

While these devices may be suitable for the particular purpose to which they address, they are not as suitable for efficiently driving a V-nail into two adjacent members of a picture frame. Conventional V-nail joiners are difficult to operate, time consuming and are inefficient.

In these respects, the frame joiner press system according to the present invention substantially departs from the conventional concepts and designs of the prior art, and in so doing provides an apparatus primarily developed for the purpose of efficiently driving a V-nail into two adjacent members of a picture frame.

BRIEF SUMMARY OF THE INVENTION

In view of the foregoing disadvantages inherent in the known types of picture frame tools now present in the prior art, the present invention provides a new frame joiner press system construction wherein the same can be utilized for efficiently driving a V-nail into two adjacent members of a picture frame.

The general purpose of the present invention, which will be described subsequently in greater detail, is to provide a new frame joiner press system that has many of the advantages of the picture frame tools mentioned heretofore and many novel features that result in a new frame joiner press system which is not anticipated, rendered obvious, suggested, or even implied by any of the prior art framing tools, either alone or in any combination thereof.

To attain this, the present invention generally comprises a base, a plurality of support shafts extending upwardly from the base, a support platform slidably positioned upon the support shafts, a plurality of retaining pins movably positioned within a support housing attached to the base, and a leverage structure for applying a downward force upon a pair of frame members. The retaining pins receive one or more V-nails and are springably positioned within the support housing. When the frame members are pressed upon the V-nails, the retaining pins are depressed into the support housing.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways., Also, it is to be understood that the phraseology and terminology employed herein are for the purpose of the description and should not be regarded as limiting.

A primary object of the present invention is to provide a frame joiner press system that will overcome the shortcomings of the prior art devices.

A second object is to provide a frame joiner press system for efficiently driving a V-nail into two adjacent members of a picture frame.

Another object is to provide a frame joiner press system that is capable of simultaneously inserting a plurality of V-nails into a picture frame joint.

An additional object is to provide a frame joiner press system that is efficient and reduces the amount of time required to manufacture a picture frame.

A further object is to provide a frame joiner press system that accurately inserts V-nails into a picture frame joint.

Another object is to provide a frame joiner press system that is adjustable to accommodate various picture frame structures.

A further object is to provide a frame joiner press system that drives V-nails into various types of picture frames.

A further object is to provide a frame joiner press system that provides variable lever pressure to the V-nail.

A further object is to provide a frame joiner press system that presses the picture frame joint directly upon one or more V-nails.

A further object is to provide a frame joiner press system that accurately presses the V-nails into the frame joint.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
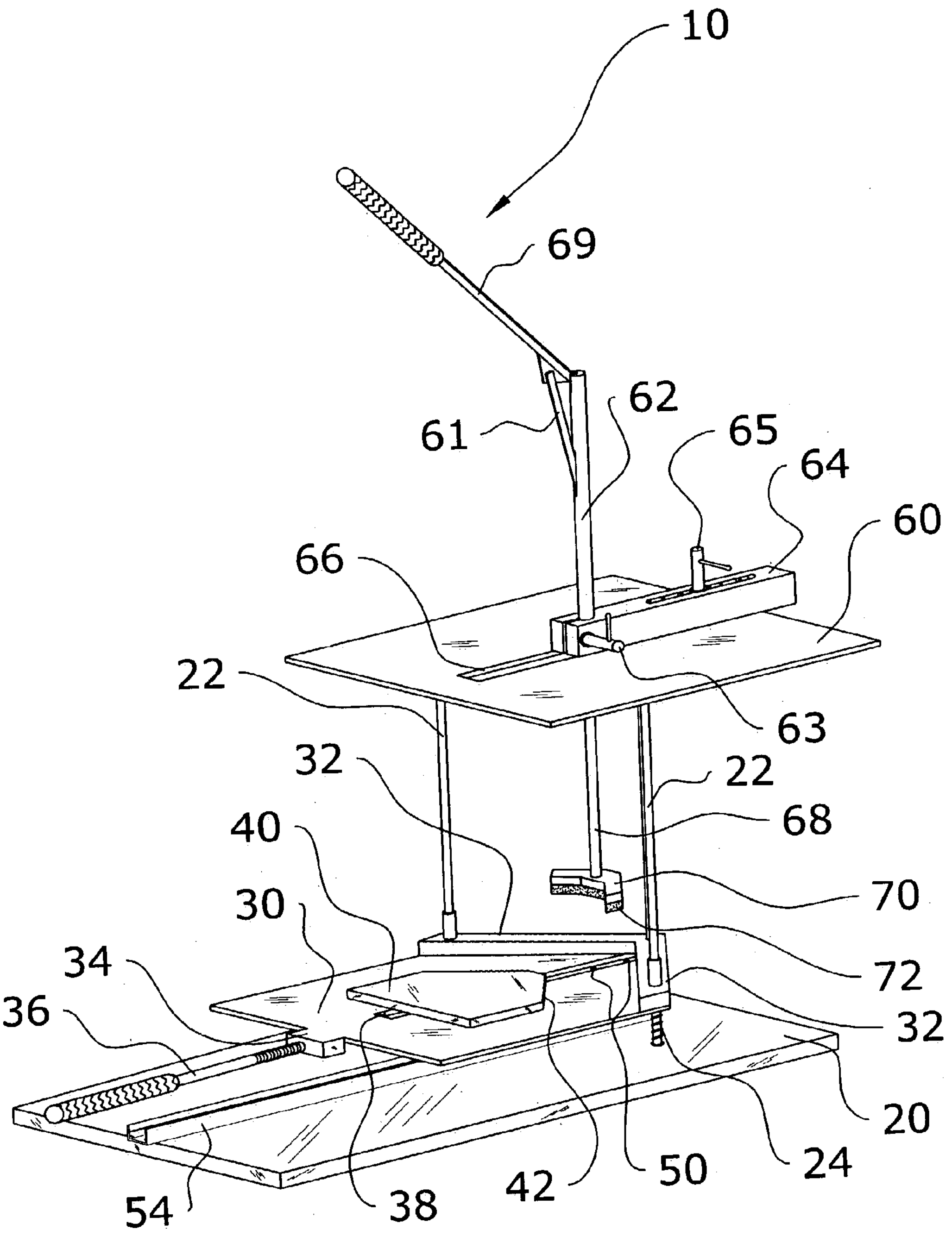
FIG. 1 is an upper perspective view of the present invention.
Figure 2:
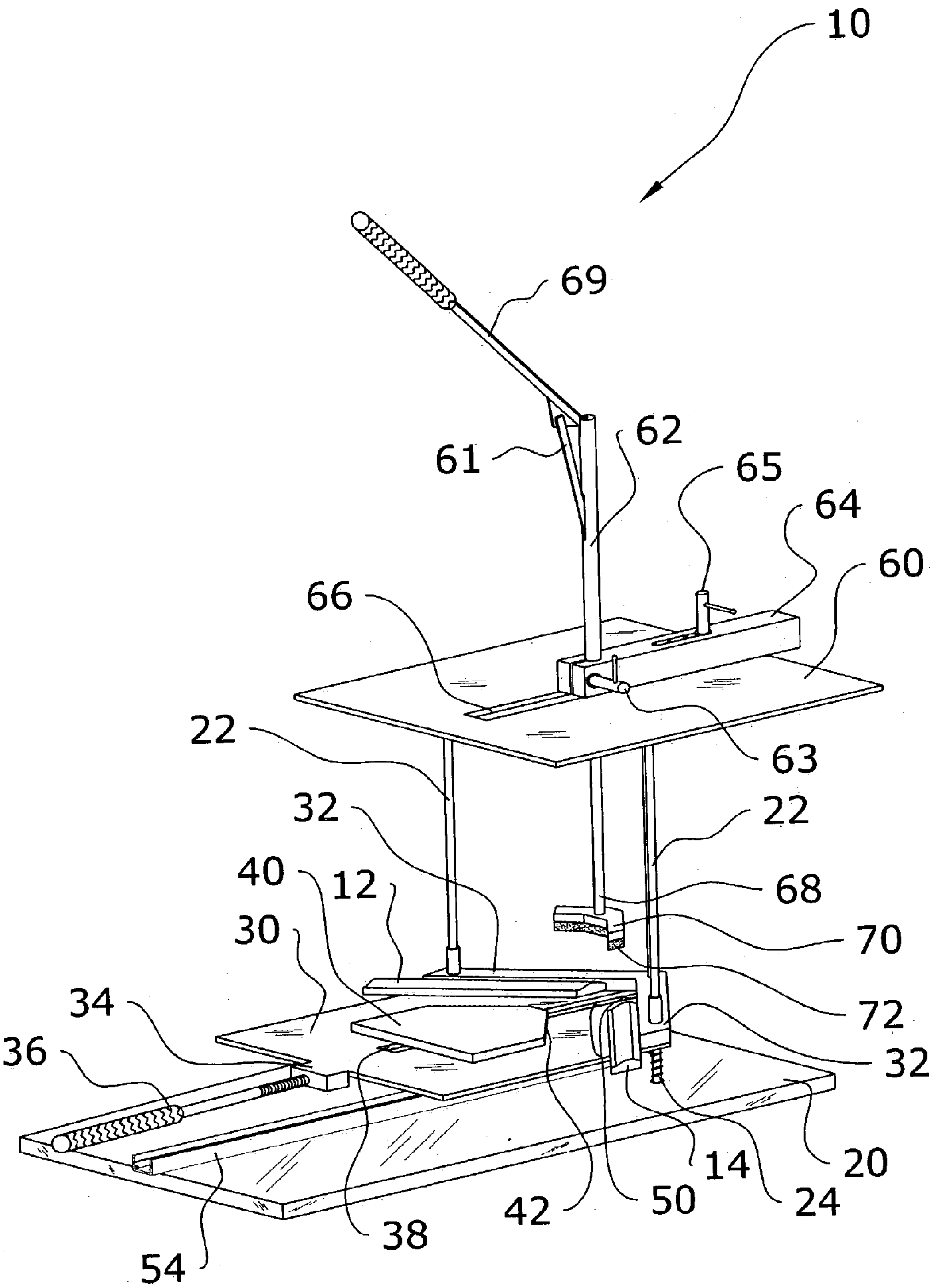
FIG. 2 is an upper perspective view of the present invention with a pair of frame members loosely positioned within.

Turning now descriptively to the drawings, in which similar reference characters denote similar elements throughout the several views, FIGS. 1 through 9 illustrate a frame joiner press system 10, which comprises a base 20, a plurality of support shafts 22 extending upwardly from the base 20, a support platform 30 slidably positioned upon the support shafts 22, a plurality of retaining pins 50 movably positioned within a support housing 52 attached to the base 20, and a leverage structure for applying a downward force upon a pair of frame members. The retaining pins 50 receive one or more V-nails 16 and are springably positioned within the support housing 52. When the frame members are pressed upon the V-nails 16, the retaining pins 50 are depressed into the support housing 52.

B. Base

FIGS. 1 through 6 of the drawings illustrate the base 20. The base 20 is preferably a flat and broad structure as shown in the figures. However, the base 20 may have various other configurations and structures capable of supporting the present invention. The base 20 may be constructed so as to be permanently or removably attached to another structure.

C. Support Shafts

As shown in FIGS. 1 through 6 of the drawings, a plurality of support shafts 22 extend upwardly from the base 20. The support shafts 22 may be comprised of various elongate structures. The support shafts 22 extend transversely from the base 20 as further shown in FIGS. 1 through 6 of the drawings. As shown in FIGS. 1 through 4 of the drawings, the support shafts 22 may be arranged in a triangular pattern, however various other patterns may be utilized.

D. Support Platform

Figure 3:
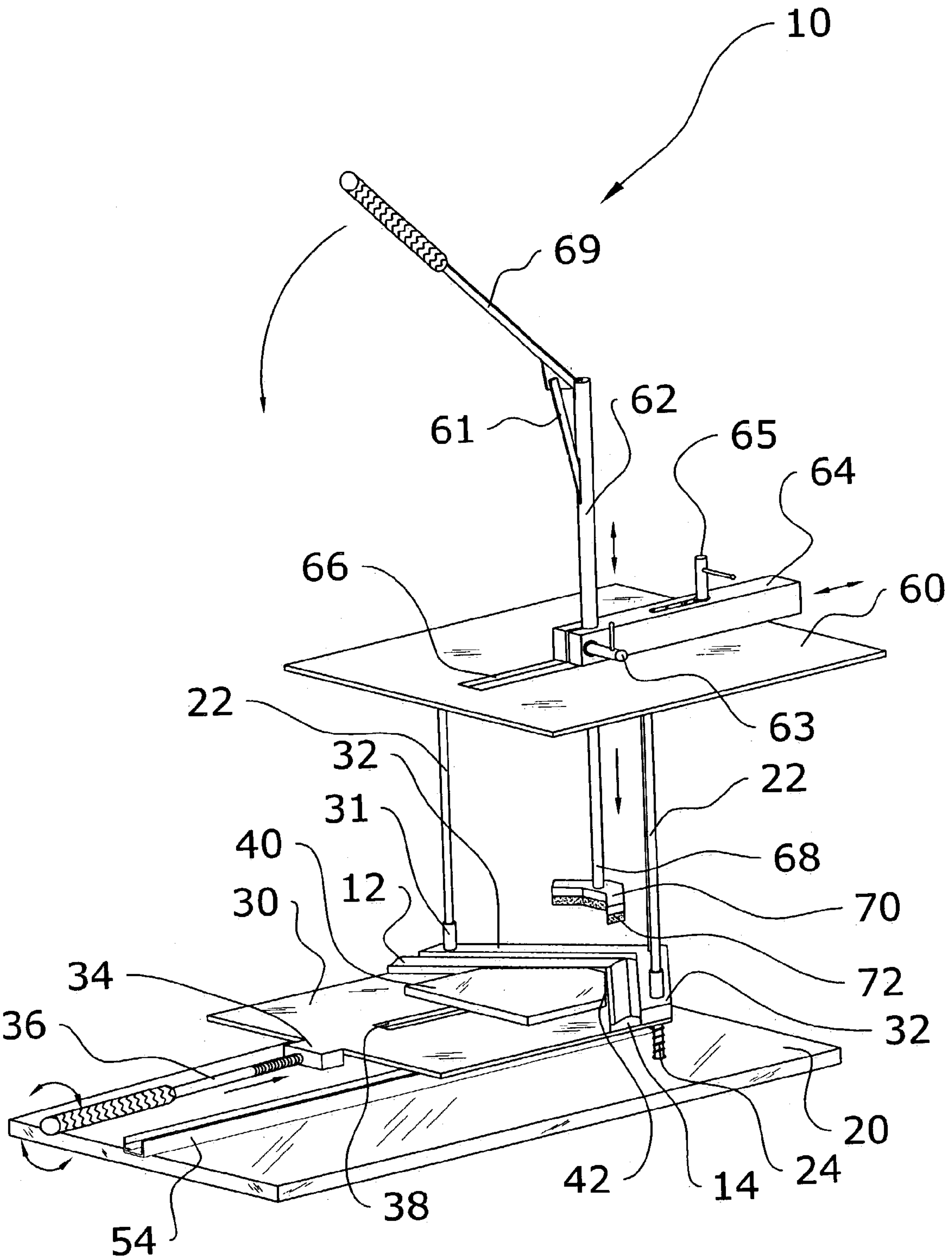
FIG. 3 is an upper perspective view of the present invention with a pair of frame members secured within.
Figure 4:
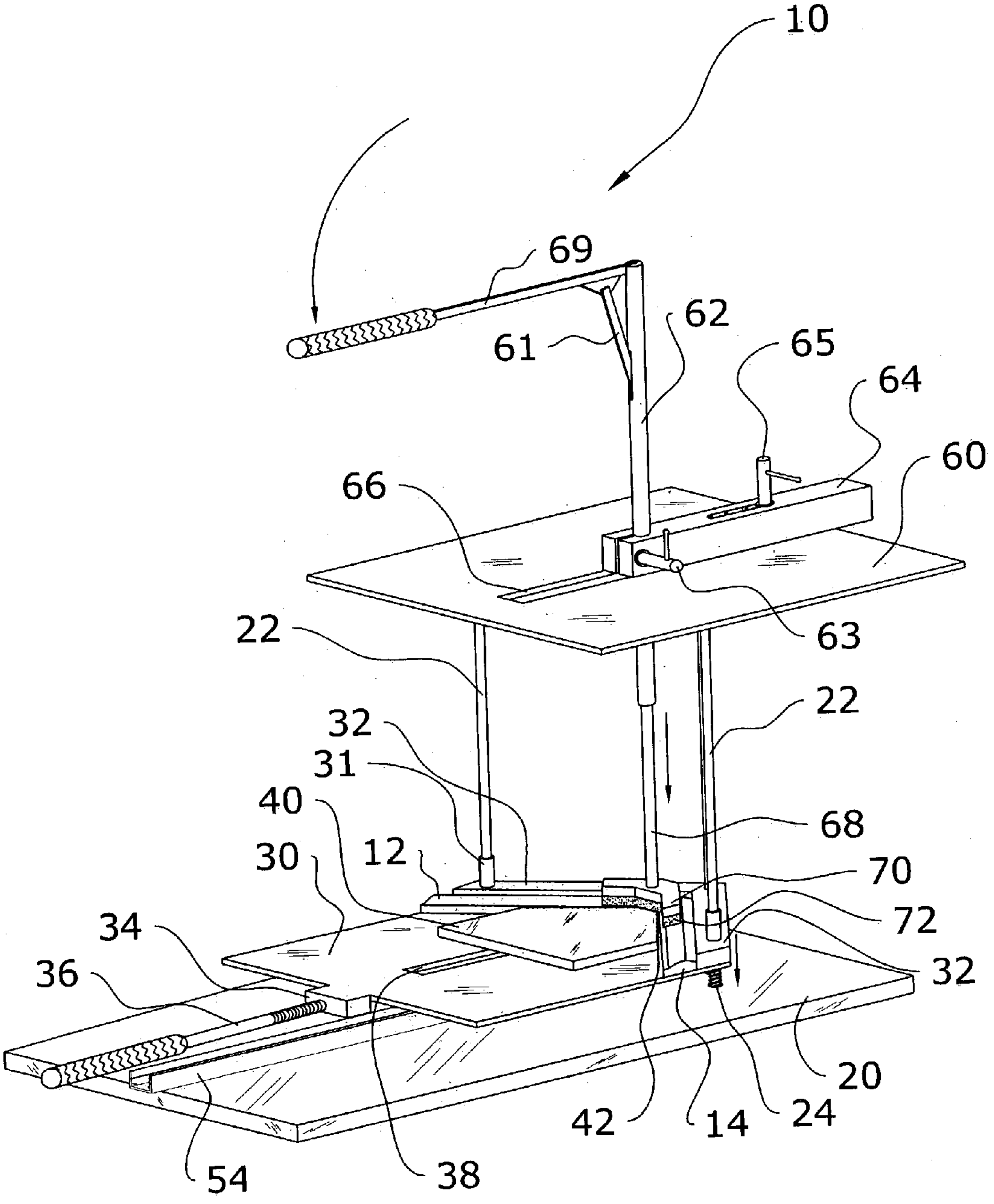
FIG. 4 is an upper perspective view of the present invention with the two frame members being pressed upon a pair of V-nails.
Figure 5:
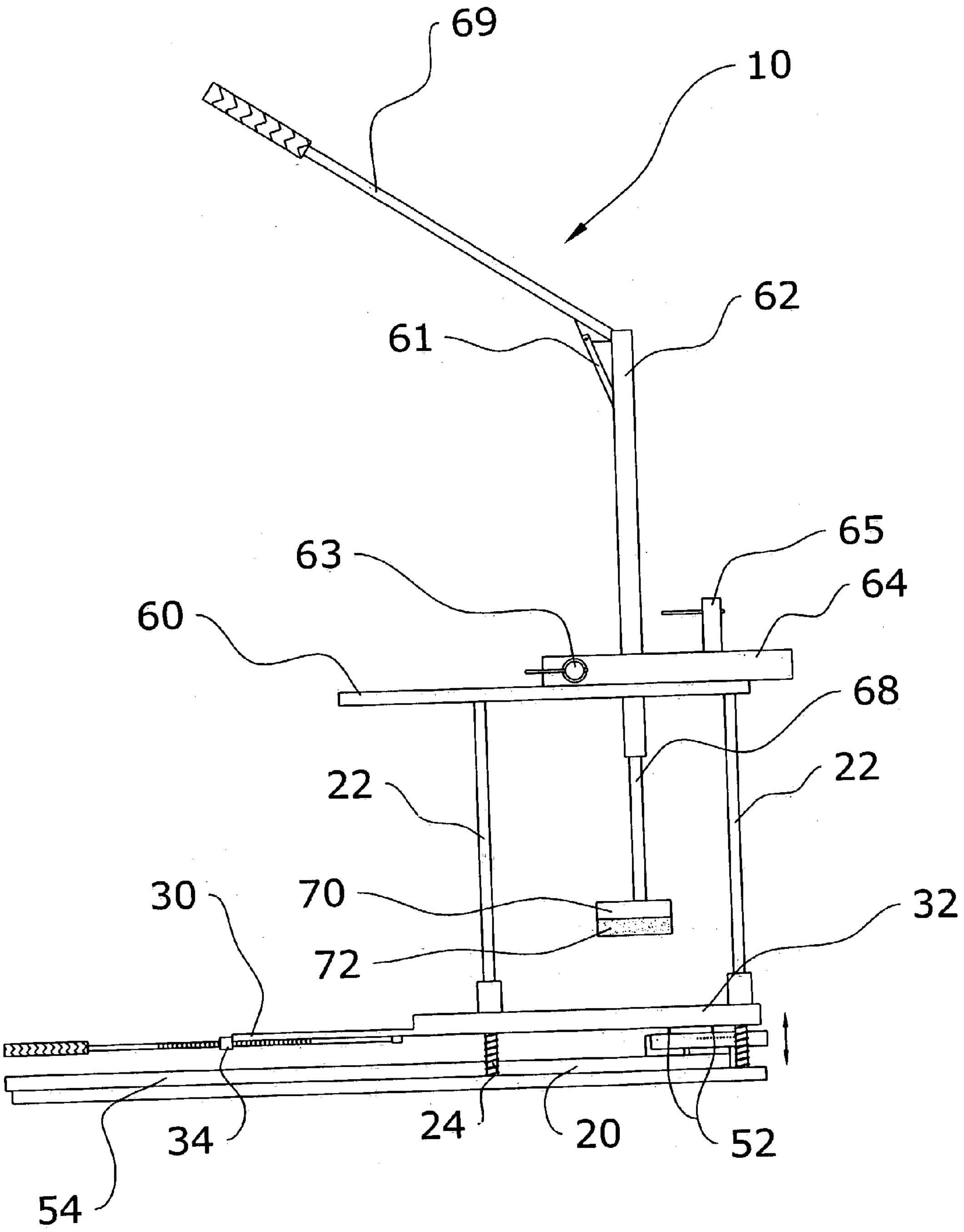
FIG. 5 is a side view of the present invention.
Figure 6:
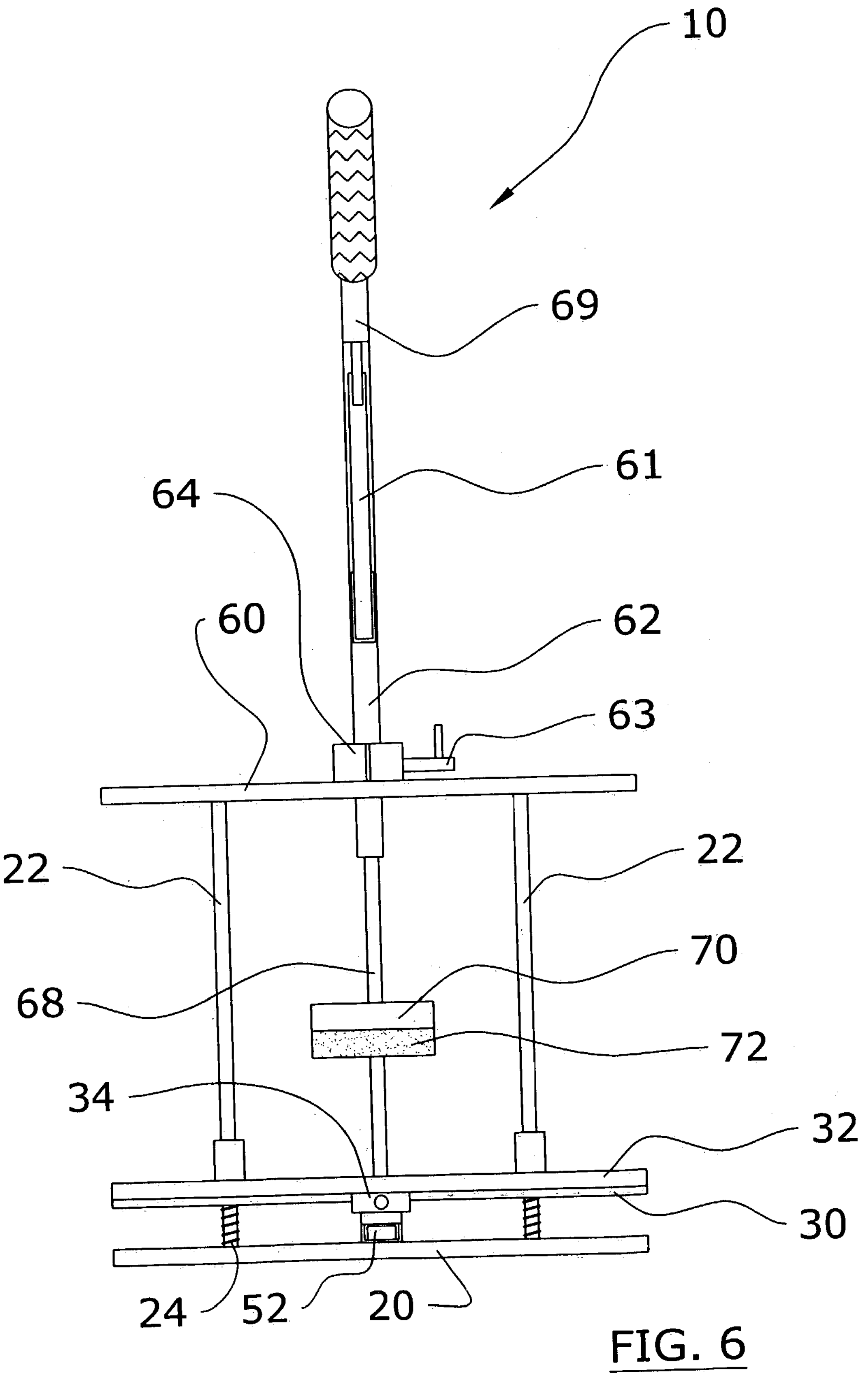
FIG. 6 is a rear view of the present invention.

As shown in FIGS. 1 through 4 of the drawings, a support platform 30 is provided preferably having a platform slot 38. The support platform 30 is preferably slidably positioned upon the support shafts 22 as illustrated in FIGS. 3 and 4 of the drawings. The support platform 30 is capable of receiving a first member 12 and a second member 14 to be joined together into a frame structure with one or more V-nails 16 as shown in FIGS. 2, 3, 4 and 7*c* of the drawings.

As shown in FIGS. 1 through 6 of the drawings, a plurality of springs 24 are positioned between the base 20 and the support platform 30. The springs 24 are each positioned about a respective support shaft and support the support platform 30 above the retaining pins 50. The springs 24 are compressible when the leverage structure applies a downward force to the first member 12 and the second member 14. During compression of the springs 24, the support platform 30 is lowered and the V-nails 16 retained within the retaining pins 50 are thereafter inserted into the first member 12 and the adjacent second member 14. Various spring and biasing structures may be utilized with the present invention to support the support platform 30.

As shown in FIGS. 1 through 4 and 7*a* through 7*c*, a pair of guide members 32 are attached to the support platform 30 forming a V-shaped structure for positioning a first member 12 and a second member 14 adjacent thereto. The guide members 32 may have various angles between thereof, however the desired angle between the guide members 32 is ninety degrees for the creation of picture frames. The guide members 32 may have various heights required to sufficiently retain the first member 12 and the second member 14. The guide members 32 may be comprised of a single structure or multiple structures attached to the support platform 30. The guide members 32 may also be integrally formed within the support platform 30.

As shown in FIGS. 1 through 4 of the drawings, a plurality of guide tubes 31 are attached to the support platform 30. The guide tubes 31 are slidably positioned about the support shafts 22 for assisting in the alignment and sliding of the support platform 30.

A locking member 40 is movably positioned upon the support platform 30 for selectively locking a first member 12 and a second member 14 between the locking member 40 and the guide members 32 as shown in FIGS. 1 through 4 of the drawings. An adjustment member 36 threadably positioned within an extended portion 34 of the support platform 30 engages the locking member 40 to slide the locking member 40 within the platform slot 38 as shown in FIGS. 1 through 4 of the drawings.

The locking member 40 has an engaging edge 42 that engages the first member 12 and the second member 14. The engaging edge 42 preferably has a first angled portion, a front straight portion and a second angled portion opposite of the first angled portion. The angle between the first angled portion and the second angled portion preferably reflects the angle of the guide members 32.

E. V-Nail Retaining Structure

Figure 9:
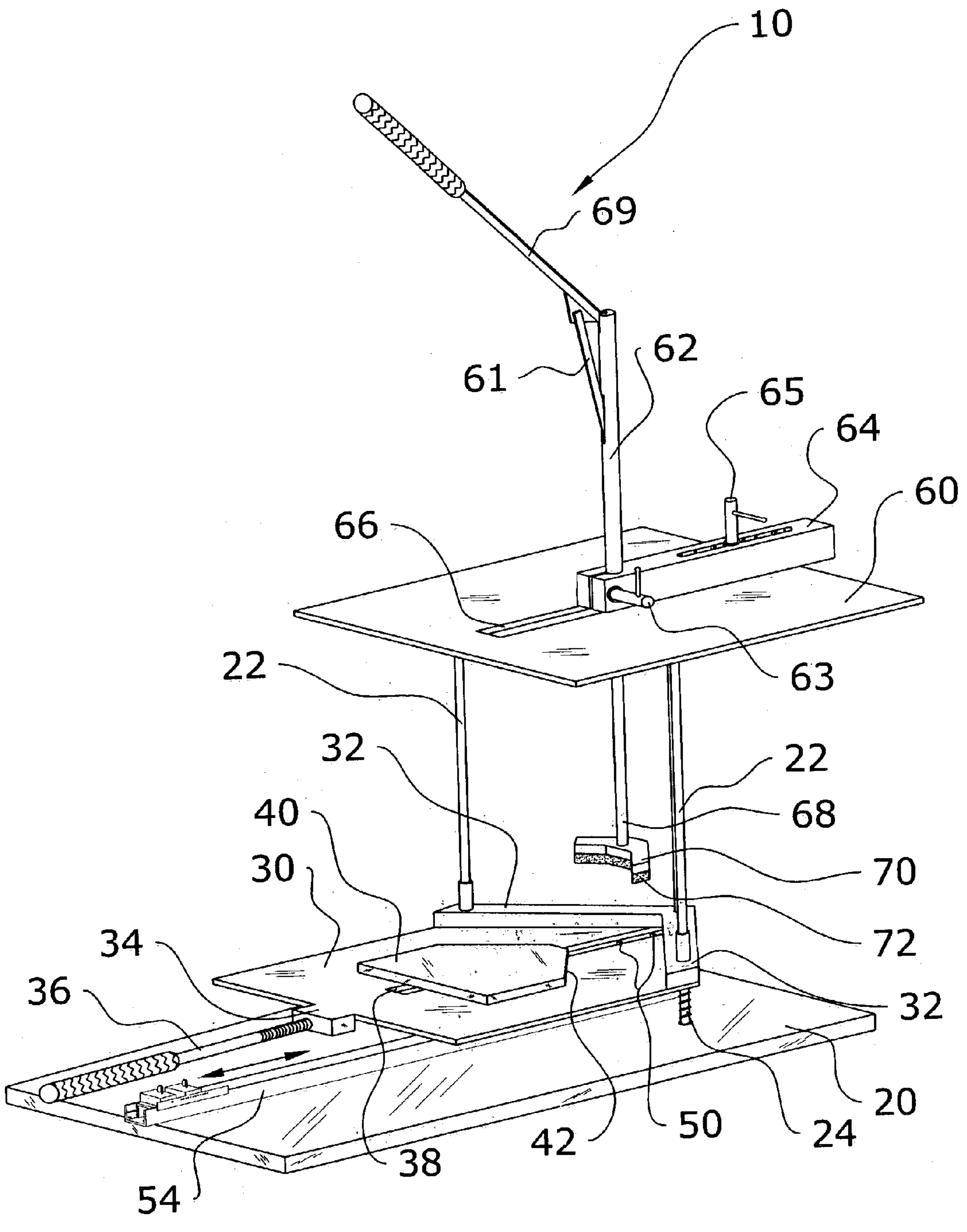
FIG. 9 is an upper perspective view of the present invention with the V-nail receivers slidably positioned upon the slide rail.

As shown in FIGS. 1 through 7*c* of the drawings, at least one retaining structure is movably or non-movably connected to the base 20 below the platform slot 38 for retaining one or more V-nails 16 for insertion into the first member 12 and the second member 14. As shown in FIG. 9 of the drawings, the retaining structure may be slidably supported upon a slide rail 54 for allowing easy loading. The retaining structure may be comprised of various structures not illustrated in the drawings. It can be appreciated that various numbers of retaining structures may be utilized to retain a corresponding number of V-nails 16 to be inserted into a picture frame joint.

The retaining structure is preferably comprised of a plurality of retaining pins 50 depressibly positioned within a support housing 52 for receiving a V-nail. The retaining pins 50 are preferably springably positioned within the support housing 52 in a transverse manner as illustrated in FIGS. 8*a* through 8*d* of the drawings. In addition, the plurality of retaining pins 50 are preferably comprised of three retaining pins 50 forming a straight pattern as best illustrated in FIG. 8*d* of the drawings. Various other numbers and structures of retaining pins 50 may be utilized within the support housing 52.

The retaining pins 50 are movably positioned within apertures within the support housing 52. The retaining pins 50 may have a pointed or blunt upper end. A biasing device within the apertures applies an upward biasing force to the retaining pins 50 so they remain fully extended until the first member 12 and the second member 14 are positioned upon thereof.

F. Leverage Structure

As shown in FIGS. 1 through 6 of the drawings, a leverage structure is provided for selectively applying a downward force upon a first member 12 and a second member 14 thereby forcing them upon the V-nails 16. Various leverage structures may be utilized to apply a downward pressure upon the first member 12 and the second member 14 to be joined together with V-nails 16.

The leverage structure is preferably comprised of an upper member 60 attached to an upper portion of the support shafts 22 as shown in FIGS. 1 through 6 of the drawings. The upper member 60 may be comprised of various structures such as but not limited to a flat structure as shown in FIGS. 1 through 6 of the drawings.

A main tube 62 extends within an upper slot 66 within the upper member 60 and is preferably adjustably retained within a support member 64. A first clamp 63 within the support member 64 allows for the user to tighten against the main tube 62 when in the desired position. This allows the user to raise/lower the main tube 62. A second clamp 65 preferably extends through the support member 64 into the upper member 60 for allowing adjustment of the horizontal position of the support member 64 and the main tube 62.

As shown in FIGS. 1 through 6 of the drawings, a drive shaft 68 is slidably positioned within the main tube 62. The drive shaft 68 slidably extends downwardly through a lower opening within the main tube 62, and extends outwardly a finite distance. An engaging member 70 is attached to a lower end of the drive shaft 68 for engaging a first member 12 and a second member 14. The engaging member 70 preferably has a V-shaped structure for providing a uniform force to the joint created between the first member 12 and the second member 14. A resilient lower portion 72 is preferably attached to a bottom surface of the engaging member 70.

As shown in FIGS. 1 through 6 of the drawings, a lever arm 69 is pivotally attached to the main tube 62 and is mechanically connected to the drive shaft 68 by a connecting member 61. The downward movement of the lever arm 69 forces the drive shaft 68 downwardly and vice-versa.

G. Operation

Figure 7B:
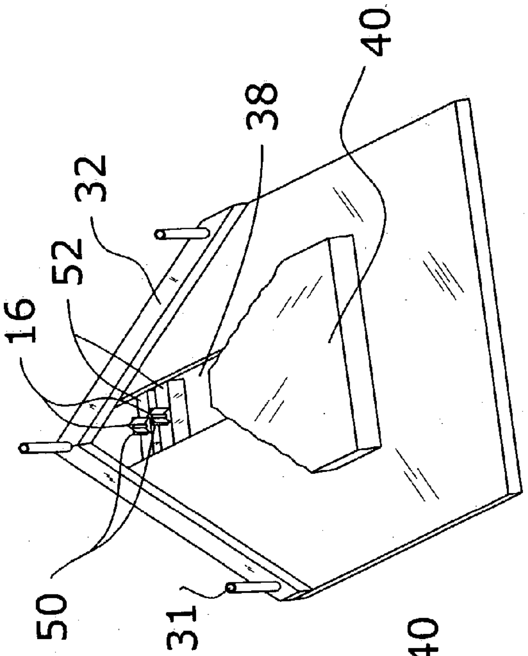
FIG. 7*b* is an upper perspective view of the support platform with a pair of V-nails positioned within the retaining pins.
Figure 7A:
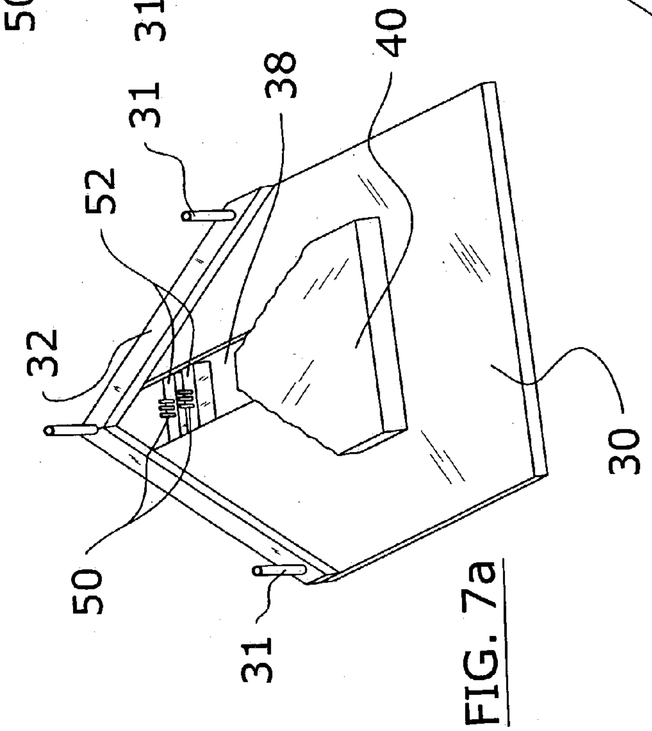
FIG. 7*a* is an upper perspective view of the support platform with the retaining pins.
Figure 7C:
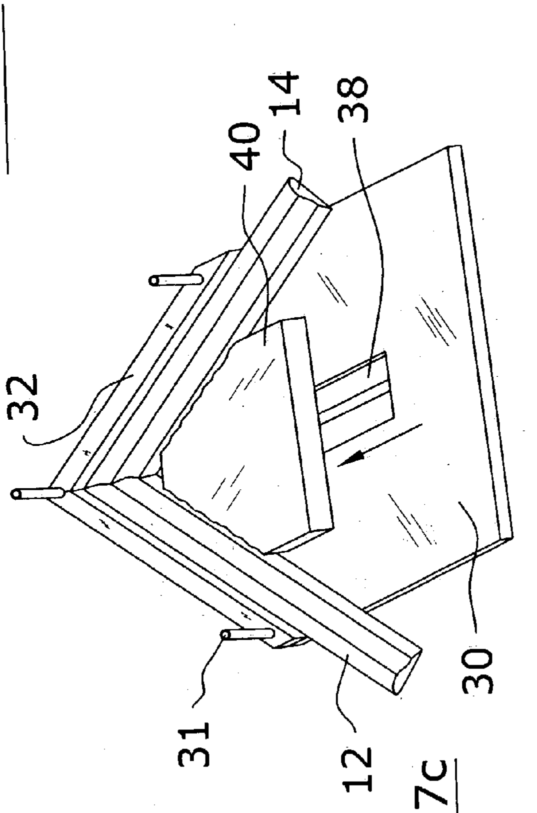
FIG. 7*c* is an upper perspective view of the support platform with a first member and a second member positioned above the pair of V-nails.
Figure 8A:
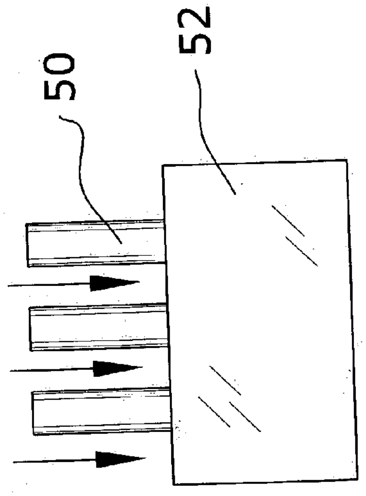
FIG. 8*a* is a side view of the support housing with retaining pins fully extended.
Figure 8B:
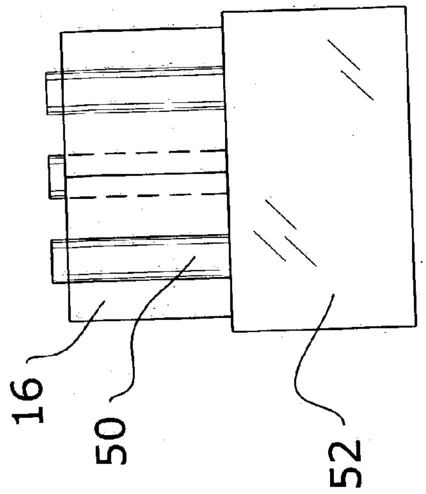
FIG. 8*b* is a side view of the support housing with a V-nail positioned within the retaining pins fully extended.

In use, the user first positions one or more V-nails 16 within the retaining pins 50 of the retaining structure as shown in FIGS. 7*b* and 8*b* of the drawings. The user then positions the first member 12 and the second member, 14 of a picture frame to be joined upon the upper surface of the support platform 30 adjacent the guide members 32 as shown in FIGS. 2, 3, 4 and 7*c* of the drawings. The user positions the first member 12 and the second member 14 so that their distal ends are adjacent to one another as best illustrated in FIG. 7*c* of the drawings.

The user then rotates the adjustment member 36 so that the locking member 40 is manipulated forwardly to engage the first member 12 and the second member 14 against the guide members 32 as shown in FIG. 7*c* of the drawings. Once the first member 12 and the second member 14 are properly retained against the guide members 32, the user then manipulates the lever arm 69 to drive the drive shaft 68 downwardly as shown in FIG. 3 of the drawings. The drive shaft 68 continues downwardly and the engaging member 70 eventually engages an upper surface of the members 12, 14 as shown in FIG. 4 of the drawings.

Figure 8C:
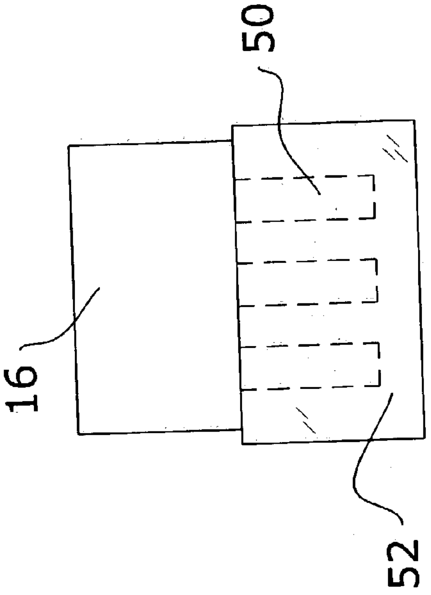
FIG. 8*c* is a side view of the support housing with the retaining pins depressed.
Figure 8D:
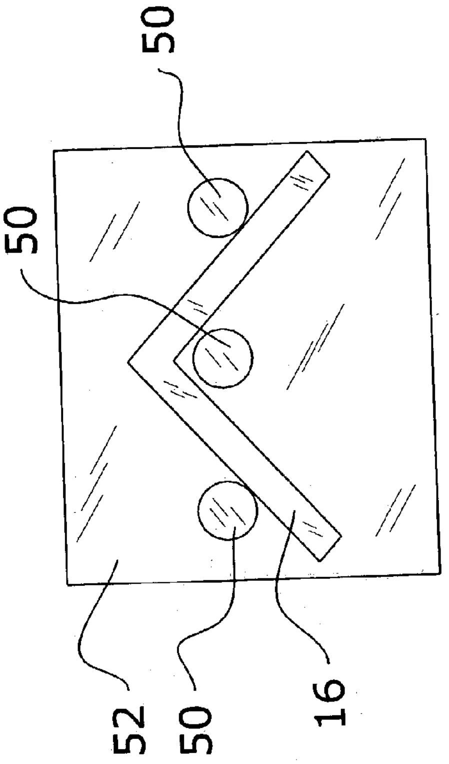
FIG. 8*d* is a top view of the support housing and retaining pins with a V-nail positioned supported within.

The user continues to manipulate the lever arm 69 thereby driving the members 12, 14 along with the support platform 30 downwardly thereby compressing the springs 24 as further shown in FIG. 4 of the drawings. The members 12, 14 are thereby forced upon the V-nails 16 within the retaining structures beneath the support platform 30 through the platform slot 38. As the members 12, 14 extended upon the V-nails 16, the retaining pins 50 are depressed into the support housing 52 as shown in FIG. 8*c* of the drawings.

After the drive shaft 68 has fully driven the members 12, 14 upon the V-nails 16 for complete insertion, the user then releases the lever arm 69 thereby raising the drive shaft 68. As the drive shaft 68 is raised, the springs 24 elevate the support platform 30 to its original position. The joined members 12, 14 are thereafter removed and the process is repeated until the picture frame is completed with the required number of members.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A frame joiner press system, comprising:

a base;

a plurality of support shafts extending upwardly from said base;

a support platform having a platform slot, wherein said support platform is slidably positioned along said support shafts, and wherein said support platform is capable of receiving a first member and a second member to be joined together with V-nails;

at least one retaining structure connected to said base below said platform slot for retaining one or more V-nails; and a leverage structure for selectively applying a downward force upon said first member and said second member.

2. The frame joiner press system of claim 1, wherein said retaining structure is comprised of a plurality of retaining pins depressibly positioned within a support housing for receiving a V-nail.

3. The frame joiner press system of claim 2, wherein said retaining pins are springably positioned within said support housing.

4. The frame joiner press system of claim 3, wherein said plurality of retaining pins are comprised of three retaining pins aligned in a straight line.

5. The frame joiner press system of claim 1, including a plurality of springs positioned between said base and said support platform.

6. The frame joiner press system of claim 5, wherein said springs are each positioned about a respective support shaft.

7. The frame joiner press system of claim 1, including a plurality of guide tubes attached to said support platform and slidably positioned about said support shafts.

8. The frame joiner press system of claim 1, including a pair of guide members forming a V-shaped structure for positioning said first member and said second member adjacent thereto.

9. The frame joiner press system of claim 8, including a locking member movably positioned upon said support platform for selectively locking said first member and said second member between said locking member and said guide members.

10. The frame joiner press system of claim 9, wherein said locking member has an engaging edge.

11. The frame joiner press system of claim 10, wherein said engaging edge has a first angled portion, a front straight portion and a second angled portion opposite of said first angled portion.

12. The frame joiner press system of claim 1, wherein said at least one retaining structure is comprised of at least two retaining structures for supporting two or more V-nails.

13. The frame joiner press system of claim 1, wherein said leverage structure is comprised of an upper member attached to an upper portion of said support shafts, a main tube within said upper member, a drive shaft slidably positioned within said main tube, a lever arm pivotally attached to said main tube and mechanically connected to said drive shaft, and an engaging member attached to a lower end of said drive shaft for engaging said first member and said second member.

14. The frame joiner press system of claim 13, wherein said main tube is vertically adjustable within said upper member.

15. The frame joiner press system of claim 13, wherein said main tube is horizontally adjustable within said upper member.

16. The frame joiner press system of claim 13, including a resilient lower portion attached to a bottom surface of said engaging member.

* * * * *